(12) United States Patent
Kim et al.

(10) Patent No.: US 9,274,204 B2
(45) Date of Patent: Mar. 1, 2016

(54) CAMERA TRACING AND SURVEILLANCE SYSTEM AND METHOD FOR SECURITY USING THERMAL IMAGE COORDINATE

(75) Inventors: Su Un Kim, Daejeon (KR); Man Yong Choi, Daejeon (KR); Jeong Hak Park, Daejeon (KR); Bong Young Ahn, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 353 days.

(21) Appl. No.: 13/637,987

(22) PCT Filed: Aug. 12, 2011

(86) PCT No.: PCT/KR2011/005950
§ 371 (c)(1),
(2), (4) Date: Sep. 28, 2012

(87) PCT Pub. No.: WO2012/023766
PCT Pub. Date: Feb. 23, 2012

(65) Prior Publication Data
US 2013/0135468 A1    May 30, 2013

(30) Foreign Application Priority Data

Aug. 16, 2010    (KR) .......................... 10-2010-0078870

(51) Int. Cl.
*H04N 7/18*    (2006.01)
*G06K 9/00*    (2006.01)
(Continued)

(52) U.S. Cl.
CPC ........... *G01S 3/7864* (2013.01); *G06K 9/00771* (2013.01); *G06K 9/2018* (2013.01);
(Continued)

(58) Field of Classification Search
CPC ......... H04N 7/181; H04N 7/183; H04N 7/18; H04N 7/188; H04N 5/33; H04N 5/332; H04N 3/09; G08B 13/19656; G01J 5/02; G01J 2005/0077
USPC ........................................................ 348/143
See application file for complete search history.

(56) References Cited

U.S. PATENT DOCUMENTS 7,965,314 B1 *   6/2011   Miller .............. G08B 13/19643
                                                         250/330
2002/0163577 A1 * 11/2002 Myers .............. G08B 13/19643
                                                         348/152

(Continued)

FOREIGN PATENT DOCUMENTS

JP   11-284988 A   10/1999
JP   2001-321005 A   11/2001
(Continued)

OTHER PUBLICATIONS

First Notification of Reasons for Rejection dated Feb. 18, 2014 for Japanese Application No. 2013-520678. No translation provided.

*Primary Examiner* — Sath V Perungavoor
*Assistant Examiner* — Howard D Brown, Jr.
(74) *Attorney, Agent, or Firm* — Frommer Lawrence & Haug LLP

(57) ABSTRACT

A camera tracing and surveillance system and method for security using a thermal image coordinate, whereby an image having high resolution for identification in which a person can be accurately identified within a surveillance area and identity of the person can be accurately checked, can be obtained using a simple algorithm.
To this end, the person within the surveillance area is identified and a position coordinate of the person is extracted from a thermal image captured by a thermal image camera, and a tracing and surveillance camera traces the person, enlarges an image of the person, and captures the enlarged image based on the extracted position coordinate so that an image having high resolution for identification can be obtained.

11 Claims, 11 Drawing Sheets

(51) Int. Cl.
  *G01S 3/786* (2006.01)
  *G06K 9/20* (2006.01)
  *H04N 5/33* (2006.01)
  *G06T 7/20* (2006.01)

(52) U.S. Cl.
  CPC .............. *G06T 7/2093* (2013.01); *H04N 5/33* (2013.01); *G06T 2207/10048* (2013.01); *G06T 2207/30196* (2013.01); *G06T 2207/30232* (2013.01)

(56) References Cited

U.S. PATENT DOCUMENTS

| | | | | |
|---|---|---|---|---|
| 2003/0093805 A1* | 5/2003 | Gin | ................ | G08B 13/19619 725/105 |
| 2003/0137593 A1* | 7/2003 | Watanabe | .......... | G06K 9/00651 348/274 |
| 2004/0032494 A1* | 2/2004 | Ito | ................ | G06K 9/00771 348/152 |
| 2004/0071319 A1* | 4/2004 | Kikuchi | ................ | G06T 7/2033 382/107 |
| 2004/0199785 A1* | 10/2004 | Pederson | ............ | G07C 9/00158 340/293 |
| 2005/0128291 A1* | 6/2005 | Murakami | ............. | H04N 7/181 348/143 |
| 2006/0204037 A1* | 9/2006 | Watanabe | .......... | G06K 9/00805 382/104 |
| 2008/0211915 A1* | 9/2008 | McCubbrey | ..... | G08B 13/19608 348/159 |

FOREIGN PATENT DOCUMENTS

| | | |
|---|---|---|
| JP | 2004-357014 A | 12/2004 |
| JP | 2005-277698 A | 6/2005 |
| KR | 10-1999-0079810 A | 11/1999 |
| KR | 10-2006-0095612 A | 9/2006 |
| KR | 10-2009-0061405 A | 6/2009 |
| KR | 10-2010-0034085 | 4/2010 |

* cited by examiner

1. MAKE DATABASE RELATING TO EXTRACTION OF FEATURE POINTS OF OBJECT

2. DETECT (CAPTURE) AFTER COMPARISON OF FEATURE POINTS IN IMAGE

3. TRACE MOVING OBJECT

| OPERATION OF EXTRACTING FEATURE POINTS IN IMAGE | $L(x,y,\sigma) = G(x,y,\sigma) * I(x,y)$ (1) |
| --- | --- |
| | $G(x,y,\sigma) = \dfrac{1}{2\pi\sigma^2} e^{\dfrac{-(x^2+y^2)}{2\sigma^2}}$ (2) |
| | $D(x,y,\sigma) = (G(x,y,k\sigma) - G(x,y,\sigma)) * I(x,y)$ (3) $= L(x,y,k\sigma) - L(x,y,\sigma)$ |
| | $m(x,y) = \sqrt{(L(x+1,y) - L(x-1,y))^2 + (L(x,y+1) - L(x,y-1))^2}$ |
| | $\theta(x,y) = \tan^{-1}\left(\dfrac{L(x,y+1) - L(x,y-1)}{L(x+1,y) - L(x-1,y)}\right)$ (4) |
| FEATURE POINT MATCHING OPERATION | $d(A,B) = \sqrt{A^2 - B^2}$ (5) |
| | $\dfrac{d(f^A, f^C)}{d(f^A, f^{C1})} \leq 0.5$ (6) |
| FEATURE POINT VECTOR GENERATION AND CAMERA CONTROL | $\begin{bmatrix} u \\ v \end{bmatrix} = \begin{bmatrix} m_1 & m_2 \\ m_3 & m_4 \end{bmatrix} \begin{bmatrix} x \\ y \end{bmatrix} + \begin{bmatrix} t_x \\ t_y \end{bmatrix}$ (7) |
| | $\begin{bmatrix} u_1 \\ v_1 \\ u_2 \\ v_2 \\ u_3 \\ v_3 \end{bmatrix} = \begin{bmatrix} x_1 & y_1 & 0 & 0 & 1 & 0 \\ 0 & 0 & x_1 & y_1 & 0 & 1 \\ x_2 & y_2 & 0 & 0 & 1 & 0 \\ 0 & 0 & x_2 & y_2 & 0 & 1 \\ x_3 & y_3 & 0 & 0 & 1 & 0 \\ 0 & 0 & x_3 & y_3 & 0 & 1 \end{bmatrix} \begin{bmatrix} m_1 \\ m_2 \\ m_3 \\ m_4 \\ t_x \\ t_y \end{bmatrix}$ (8) |
| | $(dx, dy) = (u - x, v - y)$ (9) |
| | $magnitude = \sqrt{dx^2 + dy^2}$ (10) |
| | $\theta = \tan^{-1}\dfrac{dy}{dx}$ (11) |

FIG.4

WHOLE AREA CAMERA IMAGE

TRACING AND SURVEILLANCE CAMERA IMAGE

| SITUATION | WHOLE AREA SURVEILLANCE CAMERA | THERMAL IMAGE CAMERA | TRACING AND SURVEILLANCE CAMERA |
|---|---|---|---|
| GENERAL SITUATION | | | STANDBY MODE |
| INVADER APPEARS | | | OBTAIN COORDINATE OF INVADER |
| TRACE FIRST TARGET /PHOTOGRAPH FACE CONVERGENTLY | | | |
| TRACE SECOND TARGET /PHOTOGRAPH FACE CONVERGENTLY | | | |

FIG. 10

CAMERA TRACING AND SURVEILLANCE SYSTEM AND METHOD FOR SECURITY USING THERMAL IMAGE COORDINATE

This application is a 371 of PCT/KR2011/005950 filed on Aug. 12, 2011 published on Feb. 23, 2012 under publication number WO 2012/023766 A which claims priority benefits to Korean Patent Application Number 10-2010-0078870 filed Aug. 16, 2010, the entire disclosure of which is incorporated herein by reference.

CROSS-REFERENCE TO RELATED PATENT APPLICATION

This application claims the benefit of Korean Patent Application No. 10-2010-0078870, filed on Aug. 16, 2010, in the Korean Intellectual Property Office, the disclosure of which is incorporated herein in its entirety by reference.

BACKGROUND OF THE INVENTION

1. Field of the Invention

The present invention relates to a camera tracing and surveillance system and method for security, and more particularly, to a camera tracing and surveillance system and method for security, whereby an image having high resolution for identification in which a person can be accurately identified within a surveillance area and identity of the person can be accurately checked, can be obtained.

2. Description of the Related Art

A wide variety of types of surveillance systems using cameras have been recently used in the field of industry, and such camera surveillance systems have been actively utilized for security and crackdown.

Although some cameras for car crackdown are installed on the road in order to capture an image of a necessary area by controlling the position of a camera (adjusting an image-capturing direction), most security surveillance cameras that surveil a visitor or an invader by capturing an image of a current particular place are whole area surveillance cameras that capture an image of the whole of a surveillance area at a particular distance and within the range of a viewing angle.

Since such whole area surveillance cameras as fixed cameras surveil a predetermined wide area, they have a limitation in resolution. Thus, in most cases, a face of a person within a surveillance area cannot be accurately identified using only an image captured by a whole area surveillance camera.

Thus, a system for dynamically tracing a person using a camera has been recently developed. However, the level of tracing technology is still low and thus it is not easy to apply the tracing technology in an actual site. It is not possible to effectively trace only a person using tracing algorithms that depend on a charge-coupled device (CCD) image according to the related art, because there are a wide variety of objects that move on a screen.

As a result, technology for accurately tracing only a person and capturing an image of the person is necessary. In addition, when there are several surveillance objects, the development of technology for surveiling multiple targets is a serious problem.

Representative tracing methods according to the related art and their technical problems are as follows.

1) Representative method relating to background and object distribution (difference picture algorithm/background model)

Difference Picture Algorithm

This is a method of separating an object from a background by comparing two images delayed for a predetermined amount of time, whereby an object that moves in a fixed background can be effectively detected.

FIG. 1 illustrates an object distributed image obtained using a difference picture algorithm according to the related art.

Background Model

This is a method of adding an image of a current frame to a background image as a base by checking every previous frame of a current image, and the method is mainly used in generating a background image.

Temporal mean: it uses a mean value of pixel values of previous frames

Temporal median: it uses a value shown in a previous frame at an arbitrary pixel Technical Problems When there is a minute motion or no motion, object detection is not possible (recognized as a background), and when a boundary between objects is similar to a background, false recognition occurs, and when a camera and a background move simultaneously or when only the background moves, background and object distribution is not possible.

2) Detection and tracing of moving object (feature-based method/area-based method)

Feature-Based Method

Method Using Optical Flow: it uses a feature that there is only a spatial change in two continuous frames obtained within a short time and light energy of a pixel itself is preserved.

Method Using Straight Line: it has a feature that the number of straight lines in one image is small and the straight lines themselves are clear, and thus a number of occasions of potential matching can be reduced.

Method Using Corner Point: it traces an object by featuring the shape of a moving object based on feature flow-based information.

Area-based Method: it traces an object using correlation between an image and the next image using a piece of the image in a predetermined area including a feature point of the image.

Block Matching Method: correlation is obtained using differences between mean squares and the sum of differences between absolute values of a pixel FIG. 2 illustrates a tracing method using extraction of feature points of an object according to the related art.

Technical Problems

An arithmetic operation for feature or block matching is complicated (delay in real-time processing), and a database relating to features of an object is required to be made on a system in order to detect the object.

3) Stereo-based object tracing (Optical JTC tracing/BPEJTC tracing)

This is technology for tracing an object by obtaining information regarding a distance between a left/right stereo input image and an object to be traced and by controlling both cameras using coordinates.

Optical Joint Transform Correlator (JTC) Tracing System: it traces a movement trajectory of an image based on measurement of a change in positions of frames by locating two target image signals on an optical JTC input plane.

Binary Phase Extraction JTC (BPEJTC) Tracing System: it uses an optical JTC having the shape of a binary phase having excellent discrimination on similar images.

FIG. 3 illustrates a tracing method using stereo according to the related art.

Technical Problems

When there are much background noise, or backgrounds of left and right images are different from each other, or a change in background occurs due to movement of a camera, tracing is not possible.

As mentioned above, problems of tracing methods according to the related art are summarized; first, in tracing methods according to the related art, tracing is performed by detecting movement, and second, movement is traced using a difference between frames.

Consequently, it is not easy to perform these conventional methods in real-time due to the use of mathematic approach or complicated algorithms, and when there is no movement, person recognition and tracing is not possible.

FIG. 4 illustrates an example of a tracing calculation equation according to the related art, wherein L indicates a Gaussian blurring image, and G indicates a Gaussian function, and D indicates a Difference of Gaussian (DoG) function, and m indicates the size of a feature point, and θ indicates a directional vector.

Thus, the development of technology for accurately identifying an object in real-time using a simple tracing calculation equation is needed.

SUMMARY OF THE INVENTION

The present invention provides a camera tracing and surveillance system and method for security using a thermal image coordinate, whereby an image having high resolution for identification in which a person can be accurately identified within a surveillance area and identity of the person can be accurately checked, can be obtained using a simple algorithm.

According to an aspect of the present invention, there is provided a camera tracing and surveillance system for security using a thermal image coordinate, the system including: an infrared thermal image camera for capturing an image of a predetermined surveillance area and providing the captured image as a thermal image; a tracing and surveillance camera for tracing a person as a target within the predetermined surveillance area, enlarging an image of the person and capturing the enlarged image; a position control device for performing position control of the tracing and surveillance camera to allow the tracing and surveillance camera to trace the target person within the surveillance area; and a control system for identifying the person in the surveillance area and extracting a position coordinate of the person by performing image processing of binarizing the thermal image of the surveillance area provided by the infrared thermal image camera based on a threshold, for controlling driving of the position control device based on the extracted position coordinate, and for receiving and storing an image for identification of the target person captured by the tracing and surveillance camera.

The system may further include a whole area surveillance camera for capturing an image of the same surveillance area and transmitting the captured image to the control system so as to record a visible image for checking a whole situation.

The system may further include first and second infrared lighting devices for providing infrared lighting so that each of the infrared thermal image camera, the tracing and surveillance camera, and the whole area surveillance camera performs photographing at night.

The first infrared lighting device for the tracing and surveillance camera may be installed at the tracing and surveillance camera and may move with the tracing and surveillance camera as a one body.

The system may further include a plurality of tracing and surveillance cameras for simultaneously or sequentially capturing an image for identification of multiple targets within the surveillance area, and a plurality of individual position control devices for controlling a position of each of the plurality of tracing and surveillance cameras.

According to another aspect of the present invention, there is provided a camera tracing and surveillance method for security using a thermal image coordinate, the method including: capturing an image of a predetermined surveillance area and providing the captured image as a thermal image to a control system using an infrared thermal image camera; identifying a person in the surveillance area and extracting a position coordinate of the person by performing image processing of binarizing the thermal image of the surveillance area provided by the infrared thermal image camera based on a threshold using the control system; controlling driving of a position control device based on the extracted position coordinate using the control system; when the position control device is driven, tracing the person as a target within the predetermined surveillance area, enlarging an image of the person and capturing the enlarged image using a tracing and surveillance camera; and receiving and storing an image for identification of the target person captured by the tracing and surveillance camera using the control system.

The method may further include capturing an image of the same surveillance area and transmitting the captured image to the control system so as to record a visible image for checking a whole situation using a whole area surveillance camera.

The method may further include identifying a plurality of persons within the surveillance area and extracting a position coordinate of each of the plurality of persons from the thermal image using the control system and sequentially capturing an image for identification of multiple targets when driving of the position control device and an operation of the tracing and surveillance camera are sequentially performed on each person based on the extracted position coordinate.

A plurality of tracing and surveillance cameras and a plurality of individual position control devices for controlling a position of each of the plurality of tracing and surveillance cameras may be disposed to simultaneously or sequentially capture an image for identification of multiple targets within the surveillance area.

In order to perform enlargement and image-capturing of a face of the target that can be identified, the control system may control the position of the tracing and surveillance camera using the position control device so that the tracing and surveillance camera enlarges a predetermined ratio of an upper portion of the whole area corresponding to the identified person and captures the enlarged image.

BRIEF DESCRIPTION OF THE DRAWINGS

The above and other features and advantages of the present invention will become more apparent by describing in detail exemplary embodiments thereof with reference to the attached drawings in which:

FIG. 4 illustrates an example of a tracing calculation equation according to the related art;

FIG. 10 is an exemplary view illustrating a camera tracing and surveillance method for security using a thermal image coordinate according to an embodiment of the present invention.

DETAILED DESCRIPTION OF THE INVENTION

Exemplary embodiments of the present invention will now be described with reference to the accompanying drawings in order for one of ordinary skill in the art to easily implement the invention.

The present invention relates to a camera tracing and surveillance system and method for security using a thermal image coordinate, whereby an image having high resolution for identification in which a person can be accurately identified within a surveillance area, a position coordinate of the person can be extracted, and the person can be traced, and an image of the person can be enlarged and captured by a tracing and surveillance camera based on the extracted position coordinate, can be obtained from a thermal image captured by a thermal image camera.

Figure 1:
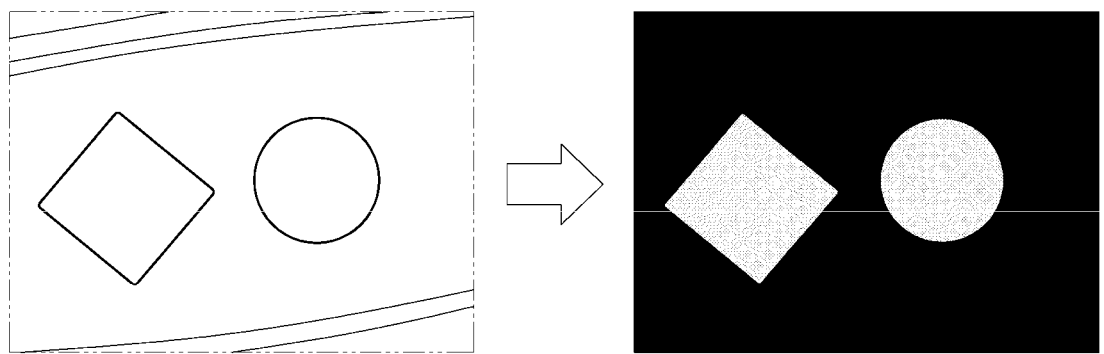
FIG. 1 illustrates an object distributed image obtained using a difference picture algorithm according to the related art.
Figure 2:
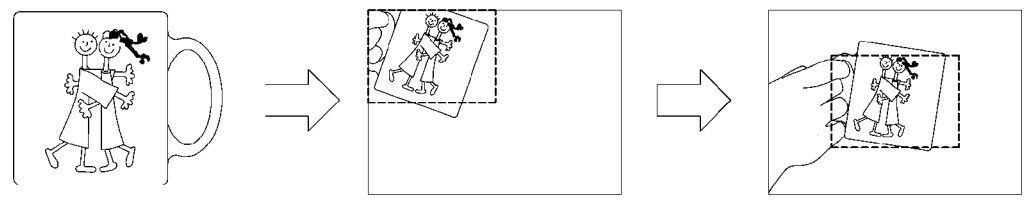
FIG. 2 illustrates a tracing method using extraction of feature points of an object according to the related art.
Figure 3:
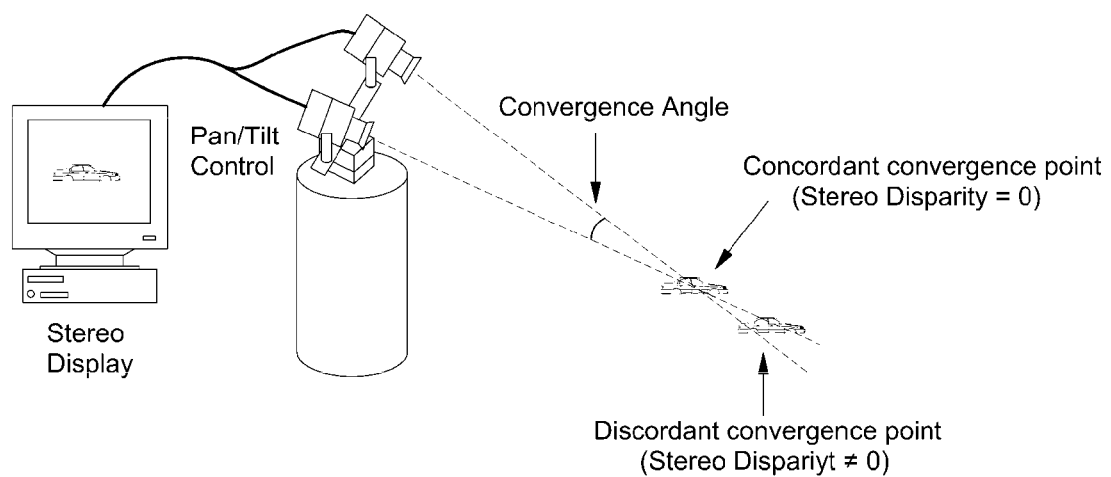
FIG. 3 illustrates a tracing method using stereo according to the related art.
Figure 5:
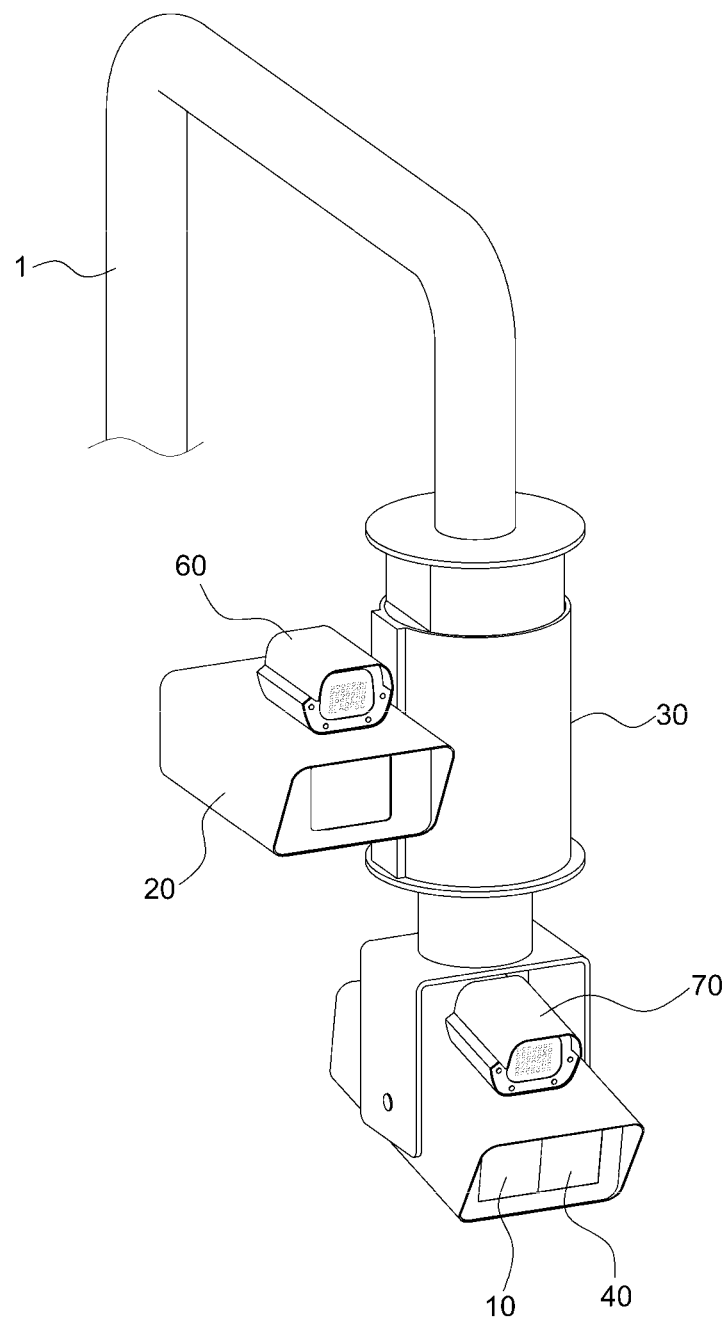
FIG. 5 is a perspective view showing a structure of a main body of a camera tracing and surveillance system for security using a thermal image coordinate according to an embodiment of the present invention.
Figure 6:
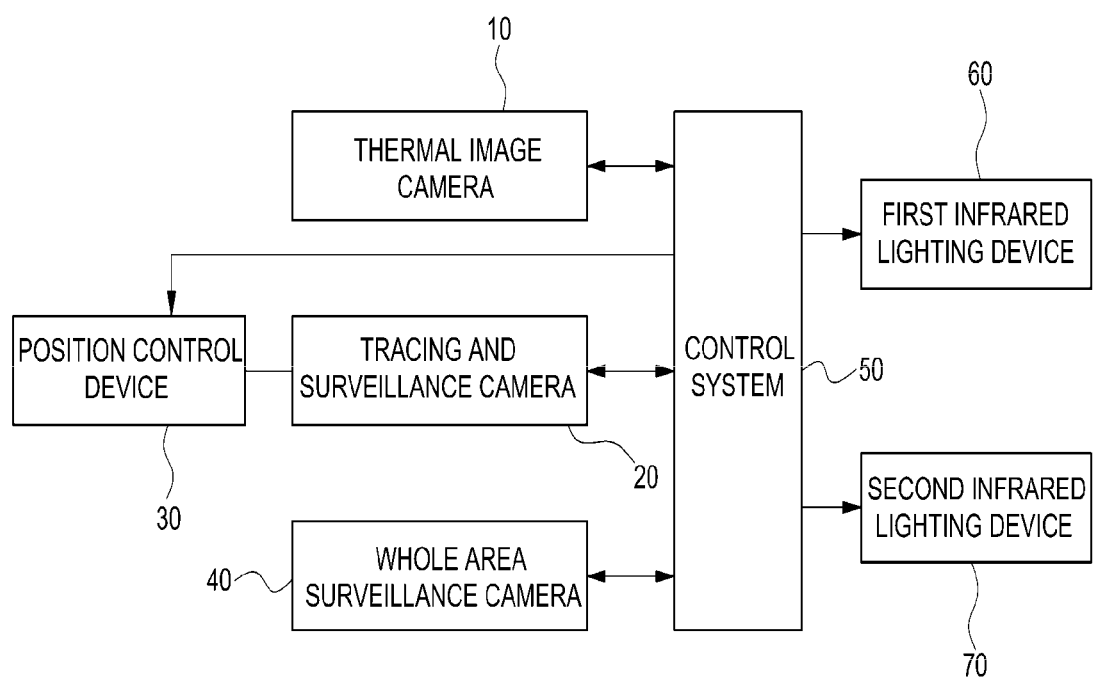
FIG. 6 is a block diagram of a structure of the camera tracing and surveillance system for security using a thermal image coordinate illustrated in FIG. 5.

FIG. 5 is a perspective view showing a structure of a main body of a camera tracing and surveillance system for security using a thermal image coordinate according to an embodiment of the present invention, and FIG. 6 is a block diagram of a structure of the camera tracing and surveillance system for security using a thermal image coordinate illustrated in FIG. 5.

Figure 7:
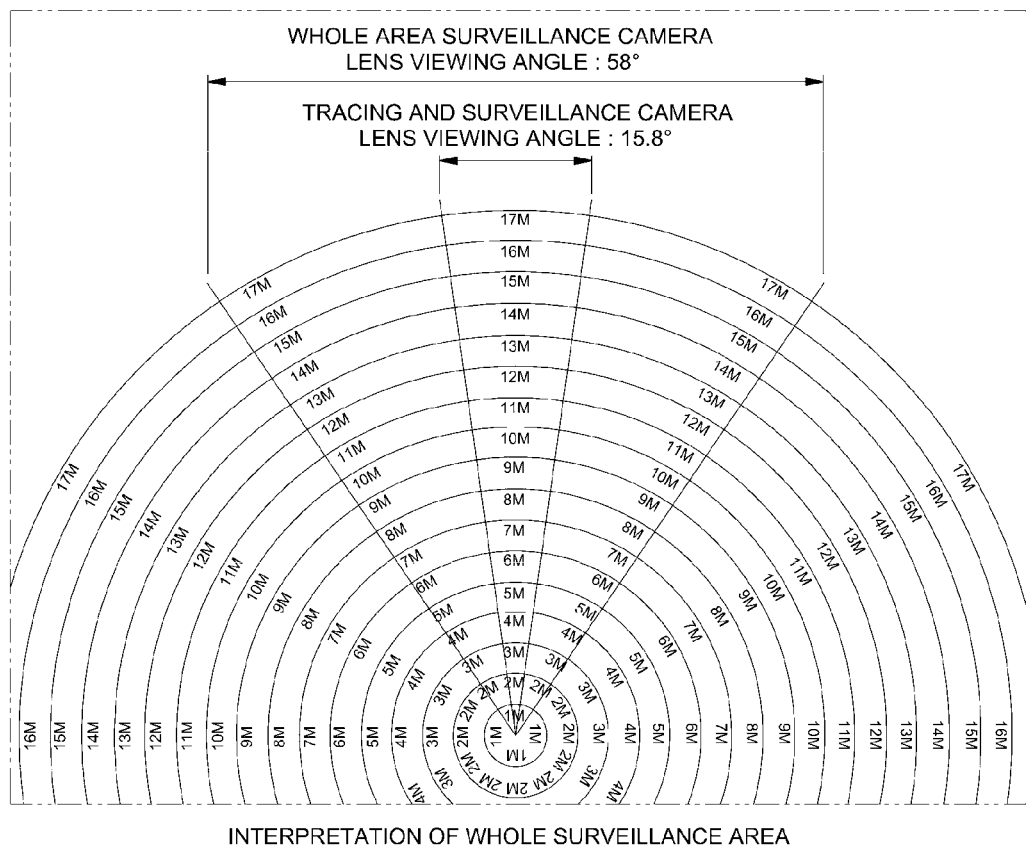
FIGS. 7, 8A, and 8B illustrate the result of interpretation of simulations performed by the present inventor.
Figure 8A:
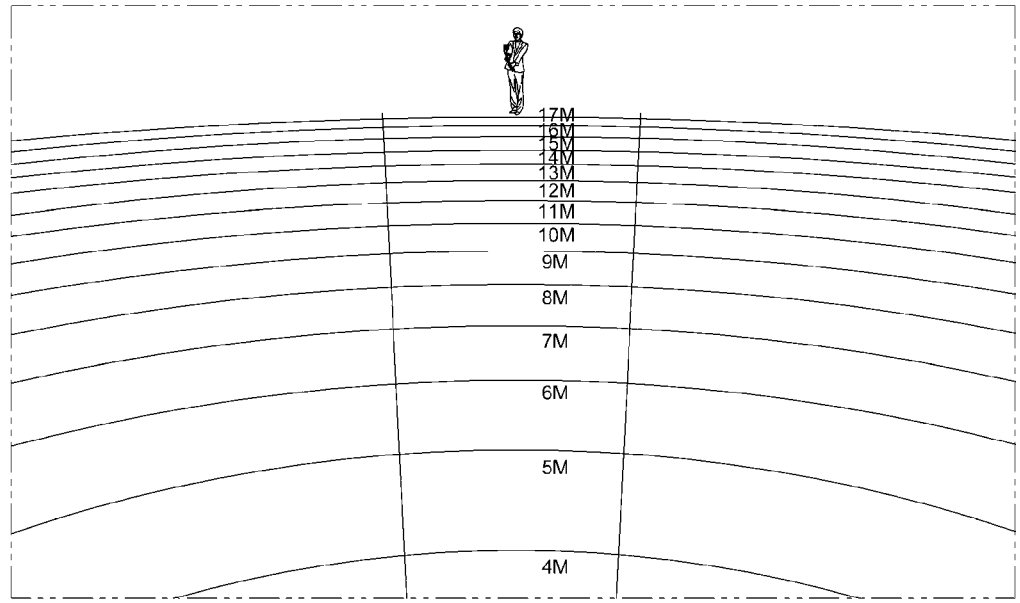
Figure 8B:
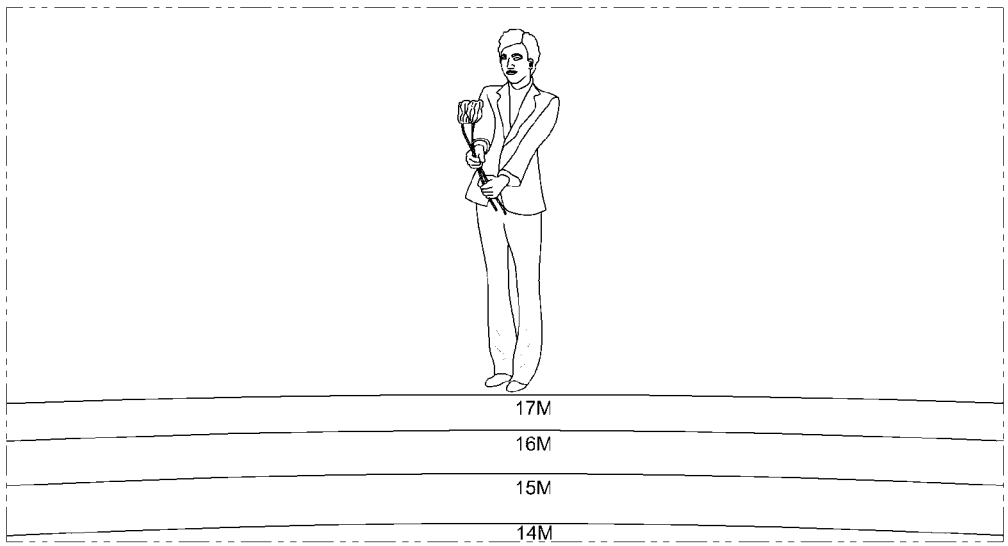

In addition, FIGS. 7, 8A, and 8B illustrate the result of interpretation of simulations performed by the present inventor.

Figure 9:
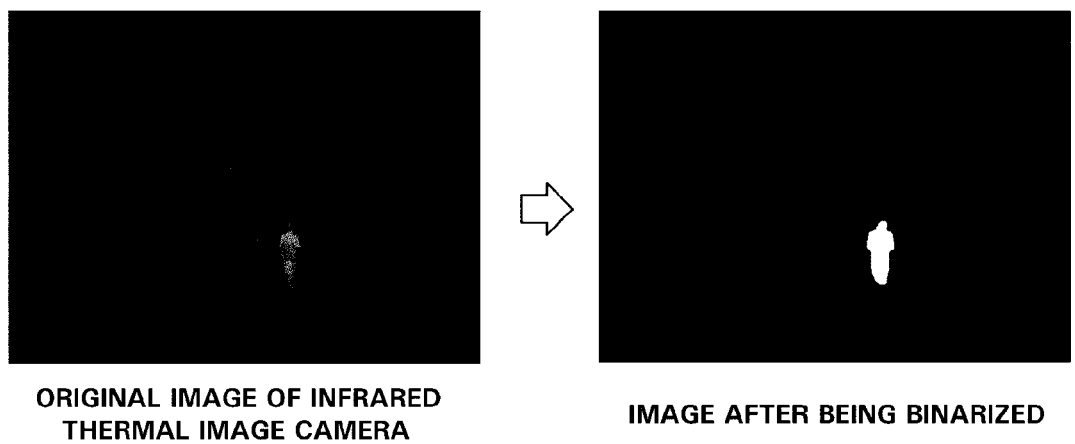
FIG. 9 illustrates a method of recognizing a person using a thermal image, according to an embodiment of the present invention.
Figure 11:
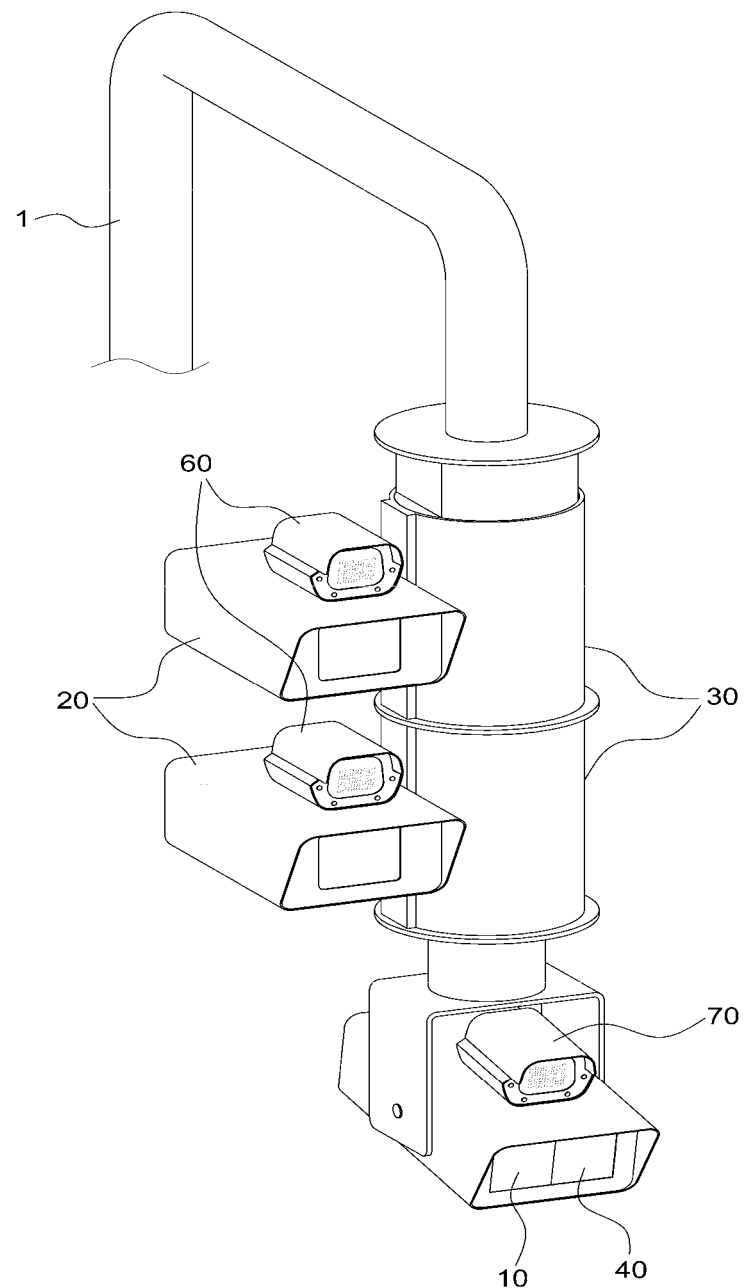
FIG. 11 illustrates a structure of a camera tracing and surveillance system on which a plurality of tracing and surveillance cameras is mounted, according to another embodiment of the present invention.

In addition, FIG. 9 illustrates a method of recognizing a person using a thermal image, according to an embodiment of the present invention, and FIG. 10 is an exemplary view illustrating a camera tracing and surveillance method for security using a thermal image coordinate according to an embodiment of the present invention, and FIG. 11 illustrates a structure of a camera tracing and surveillance system on which a plurality of tracing and surveillance cameras is mounted, according to another embodiment of the present invention.

The present invention is configured to use a zooming control tracing method of a dynamic tracing and surveillance camera using a position coordinate of a thermal image in order to solve the problem of a conventional security surveillance camera that a face of a person is not easily identified within a wide whole surveillance area due to the limitation of resolution.

That is, according to the present invention, the dynamic tracing and surveillance camera performs convergence zooming while tracing a target with fast position control by referring to information regarding a position coordinate and a size of a person obtained from a thermal image, thereby obtaining an image having high resolution for identification so that effective target tracing and face recognition can be performed.

To this end, a camera tracing and surveillance system for security using a thermal image coordinate according to an embodiment of the present invention is configured by combining three types of cameras. In detail, referring to FIGS. 5 and 6, the camera tracing and surveillance system for security according to the present embodiment includes a thermal image camera 10 that functions as a sensor for identifying a person and obtaining a position coordinate of the person in a whole surveillance area, a tracing and surveillance camera 20 that traces a target person, enlarges an image of the target person and captures the enlarged image to obtain an image for identification, a whole area surveillance camera 40 that obtains a visible image for checking the whole situation by capturing an image of the whole surveillance area, a position control device 30 that controls the position of the tracing and surveillance camera 20 at high speed, and a control system 50 that processes an image signal obtained from each of the cameras 10, 20, and 40.

In addition, the camera tracing and surveillance system for security using a thermal image coordinate illustrated in FIGS. 5 and 6 may further include first and second infrared lighting devices 60 and 70 that provide infrared lighting so that each of the cameras 10, 20, and 40 can perform photographing at night. As illustrated in FIGS. 5 and 6, a first infrared lighting device 60 for a tracing and surveillance camera that is installed at the tracing and surveillance camera 20, of which a position is dynamically controlled, and that moves with the tracing and surveillance camera 20 as a one body, and a second infrared lighting device 70 for whole area surveillance that provides lighting to the thermal image camera 10 and the whole area surveillance camera 40 for performing whole area surveillance in the same surveillance area may be installed.

In the above-described structure, the whole area surveillance camera 40 performs a function of recording a wide surveillance area, and the thermal image camera 10 that is set to have the same viewing angle as that of the whole area surveillance camera 40 performs a function of surveiling a thermal source as a target within the surveillance area, and the tracing and surveillance camera 20 performs a function of tracing and zooming image capturing on the target while a position of the tracing and surveillance camera 20 is controlled by the position control device 30 based on a thermal image coordinate (a position coordinate of the thermal source within the surveillance area obtained from the thermal image).

To sum up, the whole area surveillance camera 40 and the thermal image camera 10 are simultaneously used for whole area surveillance, wherein the whole area surveillance camera 40 obtains a visible image for checking the whole situation and the thermal image camera 10 obtains only identification and the position coordinate of the person. Thus, the thermal image camera 10 is used as an element for effectively tracing only a person within the whole surveillance area, and the tracing and surveillance camera 20 traces the target and obtains personal acquaintance data using a coordinate of the target obtained from the thermal image of the thermal image camera 10.

In this way, according to the present invention, a new type of image tracing technology that combines the thermal image camera 10 functioning as a sensor for wide area surveillance for detecting the target person, the tracing and surveillance camera 20 for tracing and zooming (enlargement) the target and obtaining an image having high resolution, and the whole area surveillance camera 40 for recording an image for checking the whole situation within the surveillance area, is used so that more effective tracing and surveillance can be performed and disadvantages of each of the cameras 10, 20, and 40 can be complemented.

With respect to each configuration of the cameras 10, 20, and 40, the thermal image camera 10 is a camera that functions as a sensor for detecting the thermal image within the surveillance area, and when a thermal source having body heat with particular temperature distribution, such as a human being, appears in the surveillance area, the thermal image camera 10 detects the thermal source.

That is, the thermal image obtained from an image of the surveillance area captured by the thermal image camera 10 is transmitted to the control system 50, and the control system 50 analyzes the obtained thermal image and identifies a person from the result of analysis and simultaneously obtains information regarding the position coordinate and size of the person.

A general infrared (IR) thermal image camera that detects infrared rays radiated from an object and forms an image from the detected infrared rays may be used as the thermal image camera 10. The IR thermal image camera 10 detects infrared rays radiated from the person according to a wavelength based on his/her body temperature and forms an image from the detected infrared rays, thereby detecting whether a person appears in the surveillance area.

The thermal image captured by the thermal image camera 10 is managed after being transmitted to the control system 50, and the control system 50 identifies the person based on the thermal image obtained by the thermal image camera 10 and extracts a position coordinate of the person in real-time.

The position coordinate of the person obtained by the control system 50 by performing the whole area surveillance of the thermal image camera 10 is used as a position coordinate of the position control device 30 that allows the tracing and surveillance camera 20 to trace the person, to enlarge and to capture an image of the person and to obtain the image.

Next, the tracing and surveillance camera 20 is a camera that captures an image having high resolution in which personal acquaintance can be recognized by tracing and zooming (zooming enlargement) the person detected by the thermal image camera 10. As described above, the tracing and surveillance camera 20 traces the person that moves within the surveillance area based on the position coordinate of the person obtained from the thermal image and captures an image of the person.

A still camera having a zooming function or a moving picture camera may be used as the tracing and surveillance camera 20. For example, a general charge-coupled device (CCD) camera having a telephoto lens or a complementary metal-oxide semiconductor (CMOS) camera may be used as the tracing and surveillance camera 20.

In addition, the tracing and surveillance camera 20 is mounted on a support 1 on which each of the cameras 10, 20, and 40 is mounted, via the position control device 30. Since position control is essential to trace a person that moves in the surveillance area, to enlarge and capture an image of the person, the tracing and surveillance camera 20 is mounted on the support 1 while being connected to the position control device 30.

An image having high resolution for identification captured by the tracing and surveillance camera 20 is transmitted to the control system 50 and is stored therein.

Next, the whole area surveillance camera 40 is a fixed camera disposed to capture the whole area of a preset surveillance area, and a general whole area surveillance camera 40 having a CCD or CMOS may be used as the whole area surveillance camera 40.

The whole area surveillance camera 40 captures an image of a scene that appears in the whole surveillance area in real-time and transmits the captured image to the control system 50. The image captured by the whole area surveillance camera 40 is stored in the control system 50 in order to check the whole situation and then is utilized.

For your reference, the result of interpretation of simulations performed by the present inventor on the assumption that a CCD camera is used as the above-described whole area surveillance camera 40 and the tracing and surveillance camera 20, will now be described with reference to FIGS. 7, 8A, and 8B.

First, a viewing angle for selecting a CCD camera to be used as the whole area surveillance camera 40 and the tracing and surveillance camera 20 can be set using the following equation 1, and the size of a CCD sensor according to circulation can be selected using Table 1.

(1)

$$f = v \times \frac{D}{V} \qquad (a)$$

$$f = h \times \frac{D}{H}, \qquad (b)$$

where
f: focal length of lens
V: Vertical size of object
H: Horizontal size of object
D: Distance from Lens to Object
v: vertical size of image
h: horizontal size of image

TABLE 1

| Format | Format Size | | | |
|---|---|---|---|---|
| | 1 inch | 2/3 inch | 1/2 inch | 1/3 inch |
| v | 9.6 mm | 6.6 mm | 4.8 mm | 3.3 mm |
| h | 12.8 mm | 8.8 mm | 6.4 mm | 4.4 mm |

The size of the CCD was selected using the above equation 1 in order to select a camera, and computer simulations thereof were performed to analyze the effect and range of visibility when the computer simulations were applied to an actual site.

A general-purpose program 3DMAX 9.0 manufactured by AUTODESK company was used as a simulation program, and the result of the simulations is shown in FIGS. 7, 8A, and 8B.

FIG. 7 illustrates distance and viewing angle that are the whole surveillance area. In the simulation, a maximum distance at which personal acquaintance of a target of the tracing and surveillance camera 20 can be identified, is 17 m, and a maximum viewing angle of the whole area surveillance camera 40 is 58°.

FIGS. 8A and 8B illustrate images captured by the whole area surveillance camera 40 and the tracing and surveillance camera 20, respectively.

Meanwhile, each camera described above is mounted on the support 1 that is fixed to a fixed structure, such as the ground or a building, and in particular, the tracing and surveillance camera 20 is mounted on the support 1 in such a way that the position of the tracing and surveillance camera 20 can be controlled by the position control device 30.

The position control device 30 allows the tracing and surveillance camera 20 to move up and down and left and right according to a control signal output from the control system 50 and allows a position of the tracing and surveillance camera 20 to be controlled. The position control device 30 adjusts an image-capturing direction of the tracing and surveillance camera 20 so as to trace a target object and to capture an image of the target object.

A configuration in which driving of the position control device 30 is controlled according to an electrical signal so that the position control device 30 controls the position of the camera automatically and a target object can be traced and photographed, may be adopted as a configuration of the position control device 30 without particular limitations.

Since a variety of position control devices for a camera have been widely used in controlling an image-capturing direction and a position of the camera in industry applications, the description of a detailed configuration of the position control device 30 is omitted.

Next, the control system 50 as an element for performing integrated control of the system, data transmission, and management controls driving of the cameras 10, 20, and 40, the position control device 30, and the first and second infrared lighting devices 60 and 70, receives an image captured by each of the cameras 10, 20, and 40 and performs processing, analysis, and storing of the image and management and storing of a wide variety of data generated in each operation.

In more detail, the control system 50 receives an image captured by the whole area surveillance camera 40 used for whole area surveillance and an image captured by the thermal image camera 10 and stores the images. The image that is captured by the whole area surveillance camera 40 and is stored in the control system 50 is obtained by recording a situation that occurs within the whole surveillance area and thus may be utilized for checking the whole situation in future.

In addition, a thermal image captured by the thermal image camera 10 is used in identifying a person that appears in the surveillance area in real-time and in extracting a position coordinate of the person, and person recognition and position tracing using the thermal image uses identification at a predetermined temperature of the thermal image. Thus, the person may be recognized by binarization without a complicated algorithm.

Thus, calculation of a tracing method may be very simplified compared to a conventional tracing calculation equation shown in FIG. 4. The control system 50 performs image processing in which the thermal image in the surveillance area captured by the thermal image camera 10 is binarized using a predetermined threshold, thereby identifying the person in the surveillance area and extracting a position coordinate of the identified person from the thermal image.

The tracing calculation equation used in this operation is as shown as the following equation 2, and FIG. 9 illustrates a binarized image.

(2)
$$DP_{ik}(x, y) = \begin{cases} 1 & \text{if } |F(x, y, i) - F(x, y, k)| > \tau \\ 0 & \text{otherwise} \end{cases},$$

where
DP: binarized image
F: thermal image
x, y: x, y coordinates of each pixel
i, k: time of each frame
τ: threshold.

Using the above calculation equation 2, the position coordinate of the person that moves within the thermal image obtained by capturing an image of the whole surveillance area can be identified and extracted. The control system 50 determines whether the thermal image F(x,y) is greater than or less than a threshold in each pixel, to identify the person and simultaneously extracts a coordinate (x,y) corresponding to the identified person from the binarized image DP(x,y).

Referring to FIG. 9, the left side indicates an original image obtained by the IR thermal image camera 10, i.e., a thermal image, and the right side indicates an image after being binarized.

In addition, the control system 50 outputs a control signal for controlling the position of the tracing and surveillance camera 20 so that the tracing and surveillance camera 20 can trace the person located at the corresponding coordinate based on the extracted coordinate (x,y). Simultaneously, the control system 50 outputs a control signal for zooming and enlarging the tracing and surveillance camera 20.

Thus, the position control device 30 controls the position of the tracing and surveillance camera 20 according to the control signal output from the control system 50 at high speed and traces the identified person within the surveillance area.

Meanwhile, when the tracing and surveillance camera 20 enlarges an image of the person at the corresponding coordinate and captures the enlarged image, the enlarged and captured image for identification is transmitted to the control system 50 and is stored in the control system 50, and when the enlargement and image-capturing operation for person tracing and face recognition is completed, the tracing and surveillance camera 20 stops tracing and enters a standby mode in order to trace the next target.

When the tracing and surveillance camera 20 enlarges and captures the image based on the position coordinate of the person obtained from the thermal image in this way, preferably, only a predetermined ratio of an upper portion of an area corresponding to a person may be set to be convergently zoomed so that a face of a person that can be identified can be convergently zoomed and photographed.

In order to perform enlargement and image-capturing of the face of the target that can be identified, the control system 50 controls the position of the tracing and surveillance camera 20 using the position control device 30 so that the tracing and surveillance camera 20 can enlarge the predetermined ratio of the upper portion of the whole area corresponding to the identified person and can capture the enlarged image.

In this case, the upper half of the body from the waist to the face of the person, from the shoulder to the face, or only the face may be convergently enlarged and photographed according to settings of a zooming rate of the tracing and surveillance camera 20. Thus, identification from the image captured by the tracing and surveillance camera 20 may be more accurately performed.

In addition, in the camera tracing and surveillance system and method for security using a thermal image coordinate according to the present invention, when several targets appear in the surveillance area simultaneously, the control system 50 controls driving of the position control device 30 and the tracing and surveillance camera 20 so that tracing and zooming photographing can be performed stepwise on second and third targets after performing the same analysis operation based on data regarding the thermal image captured by the thermal image camera 10.

Referring to FIG. 10, when two invaders appear in the surveillance area, zooming photographing for thermal image processing and invader identification, extracting and tracing of a coordinate of a first target, and obtaining of an image from which face recognition can be performed, is performed, and then, tracing and zooming photographing is performed on a second target in the same procedure.

That is, after information regarding an image for identification of the first target is obtained by the tracing and surveillance camera 20, information regarding images for identification of the second and third targets are obtained by tracing a coordinate of the next target.

In addition, as illustrated in FIG. 11, a camera tracing and surveillance system for security using a thermal image coordinate according to another embodiment of the present invention may include a plurality of tracing and surveillance cameras 20 and a plurality of individual position control devices 30 for controlling the position of each of the plurality of tracing and surveillance cameras 20. Thus, when several persons appear in the surveillance area, each tracing and surveillance camera 20 may obtain image information regarding different targets simultaneously or sequentially using each position control device 30. Thus, in this system, images for accurate identification can be captured from a plurality of persons in a place where many persons move.

In this way, the camera tracing and surveillance system for security using a thermal image coordinate according to the present invention includes a whole area surveillance camera 40 for recording a general situation within the whole surveillance area, a thermal image camera 10 that functions as a sensor for fast identifying only a person within the surveillance area, a tracing and surveillance camera 20 that traces only the person within the surveillance area, enlarges an image of the person and captures the enlarged image, a position control device 30 that controls the position of the tracing and surveillance camera 20 at high speed to trace only the person and to enlarge an image of the person and to capture the enlarged image, and a control system 50 that receives an image captured by each camera, stores the image, and circulates an image coordinate of the person into an actual coordinate based on information regarding the thermal image captured by the thermal image camera 10, in particular, and controls driving of the position control device 30 so that target tracing and enlargement and photographing of the tracing and surveillance camera 20 can be performed.

Thus, according to the present invention, the tracing and surveillance camera 20 traces a face of a person as a target whose identity can be checked using a position coordinate of the person obtained from a thermal image and enlarges an image of the face of the person and captures the enlarged image so that image information from which more precise and accurate identification can be checked can be collected.

Furthermore, as described above, when an external invader appears in a particular place, the present invention can be used for security surveillance for enlarging an image of a target person and capturing the enlarged image and can also be effectively utilized in tracing a particular object, in enlarging an image of the particular object and in capturing the enlarged image in movie industry or sports (e.g., an ice rink, etc.) applications. In this case, a moving picture camera having high resolution that can perform zooming and position control can be used as a tracing and surveillance camera.

Thus, in a camera tracing and surveillance system and method for security using a thermal image coordinate according to the one or more embodiments of the present invention, a person in a surveillance area is identified using a simple algorithm for binarizing a thermal image in the surveillance area based on a threshold, and a tracing and surveillance camera traces the identified person as a target and enlarges an image of the target person and captures the enlarged image so that an image having high resolution for identification can be obtained.

In addition, the camera tracing and surveillance system for security using a thermal image coordinate according to the present invention includes a whole area surveillance camera, a thermal image camera as a sensor for identifying a person, and a tracing and surveillance camera that traces the identified person based on information regarding a thermal image captured by the thermal image camera and enlarges an image of the person and captures the enlarged image so that disadvantages of the whole area surveillance camera and the tracing and surveillance camera can be complemented and more effective tracing can be performed.

In addition, since the tracing and surveillance camera performs sequential tracing and enlargement photographing on several targets based on a position coordinate obtained from the thermal image so that multiple targets can be effectively traced and when a plurality of tracing and surveillance cameras and a plurality of position control devices are used, multiple targets can be simultaneously traced.

In addition, when the camera tracing and surveillance system for security using a thermal image coordinate according to the present invention is applied to movie industry or sports (e.g., an ice rink, etc.), the present invention can be effectively utilized in tracing a particular object, in enlarging an image of the particular object and in capturing the enlarged image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A camera tracing and surveillance system for security using a thermal image coordinate, the system comprising:
   an infrared thermal image camera for capturing a thermal image of a predetermined surveillance area and providing the captured image as a thermal image to extract a position coordinate of a target;
   a tracing and surveillance camera for tracing the target within the predetermined surveillance area, enlarging an image of the target and capturing the enlarged image;
   a position control device for performing position control of the tracing and surveillance camera based on the position coordinate of the target extracted from the thermal image of the surveillance area to allow the tracing and surveillance camera to trace the target within the surveillance area; and
   a control system for identifying the target in the surveillance area and extracting the position coordinate of the target by performing image processing of binarizing the thermal image of the surveillance area captured by the infrared thermal image camera based on a threshold, for controlling driving of the position control device based on the position coordinate of the target extracted from the thermal image of the surveillance area, and for receiving and storing an image for identification of the target captured by the tracing and surveillance camera.

2. The system of claim 1, further comprising a whole area surveillance camera for capturing an image of the same surveillance area and transmitting the captured image to the control system so as to record a visible image for checking a whole situation.

3. The system of claim 1, further comprising first and second infrared lighting devices for providing infrared lighting so that each of the infrared thermal image camera, the tracing and surveillance camera, and the whole area surveillance camera performs photographing at night.

4. The system of claim 3, wherein the first infrared lighting device for the tracing and surveillance camera is installed at the tracing and surveillance camera and moves with the tracing and surveillance camera as a one body.

5. The system of claim 1, further comprising a plurality of tracing and surveillance cameras for simultaneously or sequentially capturing an image for identification of multiple targets within the surveillance area, and a plurality of individual position control devices for controlling a position of each of the plurality of tracing and surveillance cameras.

6. A camera tracing and surveillance method for security using a thermal image coordinate, the method comprising:
   capturing a thermal image of a predetermined surveillance area and providing the captured image as a thermal image to a control system using an infrared thermal image camera;
   identifying a target in the surveillance area and extracting a position coordinate of the target by performing image processing of binarizing the thermal image of the surveillance area captured by the infrared thermal image camera based on a threshold using the control system;
   controlling driving of a position control device based on the position coordinate of the target extracted from the thermal image of the surveillance area by the control system;
   when the position control device is driven, tracing the target within the predetermined surveillance area, enlarging an image of the target and capturing the enlarged image using a tracing and surveillance camera; and
   receiving and storing an image for identification of the target captured by the tracing and surveillance camera using the control system.

7. The method of claim 6, further comprising capturing an image of the same surveillance area and transmitting the captured image to the control system so as to record a visible image for checking a whole situation using a whole area surveillance camera.

8. The method of claim 6, further comprising identifying a plurality of targets within the surveillance area and extracting a position coordinate of each of the plurality of targets from the thermal image using the control system and sequentially capturing an image for identification of multiple targets when driving of the position control device and an operation of the tracing and surveillance camera are sequentially performed on each target based on the extracted position coordinate.

9. The method of claim 6, wherein a plurality of tracing and surveillance cameras and a plurality of individual position control devices for controlling a position of each of the plurality of tracing and surveillance cameras are disposed to simultaneously or sequentially capture an image for identification of multiple targets within the surveillance area.

10. The method of claim 6, wherein, in order to perform enlargement and image-capturing of a face of the target that can be identified, the control system controls the position of the tracing and surveillance camera using the position control device so that the tracing and surveillance camera enlarges a predetermined ratio of an upper portion of the whole area corresponding to the identified target and captures the enlarged image.

11. The system of claim 2, further comprising first and second infrared lighting devices for providing infrared lighting so that each of the infrared thermal image camera, the tracing and surveillance camera, and the whole area surveillance camera performs photographing at night.

\* \* \* \* \*